(12) United States Patent
Hou (10) Patent No.: US 12,443,193 B2
(45) Date of Patent: Oct. 14, 2025

(54) METHOD AND APPARATUS FOR DETECING UNKNOWN OBSTACLE AND MEDIUM AND ELECTRONIC DEVICE (71) Applicant: Beijing Roborock Innovation Technology Co., Ltd., Beijing (CN)

(72) Inventor: Zhengtao Hou, Beijing (CN)

(73) Assignee: BEIJING ROBOROCK INNOVATION TECHNOLOGY CO., LTD., Beijing (CN)

( * ) Notice: Subject to any disclaimer, the term of this patent is extended or adjusted under 35 U.S.C. 154(b) by 134 days.

(21) Appl. No.: 18/251,863

(22) PCT Filed: Jul. 2, 2021

(86) PCT No.: PCT/CN2021/104348
§ 371 (c)(1),
(2) Date: May 4, 2023

(87) PCT Pub. No.: WO2022/095488
PCT Pub. Date: May 12, 2022

(65) Prior Publication Data
US 2024/0012420 A1 Jan. 11, 2024

(30) Foreign Application Priority Data
Nov. 4, 2020 (CN) .......................... 202011217309.8

(51) Int. Cl.
*G05D 1/00* (2024.01)
(52) U.S. Cl.
CPC ......... *G05D 1/0214* (2013.01); *G05D 1/0246* (2013.01)

(58) Field of Classification Search
CPC .... G05D 1/0214; G05D 1/0246; G05D 1/243; G05D 2105/10; G05D 2107/40;
(Continued)

(56) References Cited

U.S. PATENT DOCUMENTS

| 6,823,270 | B1 | 11/2004 | Curtis | |
| 2002/0075180 | A1* | 6/2002 | Sakai | G01S 17/86 |
| | | | | 342/52 |

(Continued)

FOREIGN PATENT DOCUMENTS

| CN | 106054900 A | 10/2016 |
| CN | 106200645 A | 12/2016 |

(Continued)

OTHER PUBLICATIONS

Extended European Search Report of application No. 21888190.2 dated Jul. 24, 2024.
(Continued)

*Primary Examiner* — Abby Lin
*Assistant Examiner* — Esvinder Singh
(74) *Attorney, Agent, or Firm* — Calfee, Halter & Griswold LLP (57) ABSTRACT

A method and apparatus for detecting an unknown obstacle, and a medium and an electronic device. During a moving process of a autonomous mobile robot, if an obstacle of an unknown type is detected within a distance from which detection cannot be performed, the autonomous mobile robot moves away from the obstacle to be within an effective detection distance, and then navigation is performed by means of an effective detection result.

15 Claims, 3 Drawing Sheets

(58) Field of Classification Search
CPC ........... G05D 2109/10; G05D 2111/10; G05D 1/0223; G05D 1/0242; G05D 1/0259; G05D 1/0261; G05D 1/0276; G05D 1/028; G05D 1/617; G05D 1/622; G05D 1/628; G05D 1/637; G05D 1/648; G06V 20/58; A47L 9/2805; A47L 2201/04; A47L 11/24; A47L 11/4008; A47L 11/4061; A47L 2201/00; B25J 5/007; B25J 9/162; B25J 9/1656; B25J 9/1664; B25J 9/1666; B25J 9/1676; B25J 11/0085; G05B 2219/31005; G05B 2219/40455; G05B 2219/49143

See application file for complete search history.

(56) References Cited

U.S. PATENT DOCUMENTS

| 2006/0212191 | A1* | 9/2006 | Saeki | G05D 1/0225 |
| | | | | 701/25 |
| 2012/0253582 | A1 | 10/2012 | Chrysanthakopoulos | |
| 2019/0332119 | A1* | 10/2019 | Kim | G05D 1/0248 |
| 2020/0162667 | A1 | 5/2020 | Morita | |
| 2020/0225673 | A1* | 7/2020 | Ebrahimi Afrouzi | |
| | | | | A47L 11/4011 |
| 2020/0341479 | A1* | 10/2020 | Kim | B25J 19/06 |
| 2020/0341480 | A1 | 10/2020 | Jung | |
| 2023/0195130 | A1* | 6/2023 | Yin | G05D 1/0223 |
| | | | | 701/23 |
| 2024/0067510 | A1* | 2/2024 | Ulbrich | B66F 9/063 |

FOREIGN PATENT DOCUMENTS

| CN | 108268041 | A | 7/2018 |
| CN | 109739223 | A | 5/2019 |
| CN | 109965783 | A | 7/2019 |
| CN | 110063694 | A | 7/2019 |
| CN | 111708360 | A | 9/2020 |
| CN | 112401752 | A | 2/2021 |

OTHER PUBLICATIONS

International Search Report From PCT/CN2021/104348 dated Sep. 28, 2021.

Office action from Chinese Application No. 202011217309.8 dated Jul. 15, 2021.

First Office Action of EP application No. 21888190.2 dated Jun. 10, 2025.

* cited by examiner

METHOD AND APPARATUS FOR DETECING UNKNOWN OBSTACLE AND MEDIUM AND ELECTRONIC DEVICE

CROSS-REFERENCE TO RELATED APPLICATION

The present application is a National Stage of International Application No. PCT/CN2021/104348, filed on Jul. 2, 2021, which claims the benefit of priority to Chinese Application No. 202011217309.8, filed on Nov. 4, 2020, both of which are incorporated by reference herein in their entireties for all purposes.

TECHNICAL FIELD

The present disclosure relates to the field of autonomous mobile robots, and in particular to a method and apparatus for detecting an unknown obstacle, a medium and an electronic device.

BACKGROUND

After a autonomous mobile robot feeds ground conditions back to a processor through a sensor or a camera, the processor makes a judgment based on the ground conditions, and then leads the autonomous mobile robot to stably move forwards, backwards, leftwards or rightwards. For example, a sweeping robot, also known as an automatic cleaning robot, a smart vacuum cleaner, a robot vacuum cleaner or the like, is a smart home device capable of automatically cleaning the ground by virtue of artificial intelligence.

SUMMARY

This Summary section is provided to introduce the concepts in a simplified form that are described in detail in the Detailed Description section. This Summary section is not intended to define key features or essential features of the claimed technical solutions, nor is it intended to be used to limit the scope of the claimed technical solutions.

According to specific embodiments of the present disclosure, in a first aspect, the present disclosure provides a method for detecting an unknown obstacle. The method includes: moving, by an autonomous mobile robot in response to a first distance from the autonomous mobile robot to an obstacle being less than a preset detection distance and a type of the obstacle being unknown, to a first position in a direction away from the obstacle, wherein a distance from the first position to the obstacle is not less than the preset detection distance; and detecting, by the autonomous mobile robot, the obstacle at the first position and navigating based on a detection result.

According to specific embodiments of the present disclosure, in a second aspect, the present disclosure provides an apparatus for detecting an unknown obstacle. The apparatus includes: a detection unit configured to: in response to a first distance to an obstacle being less than a preset detection distance and a type of the obstacle being unknown, move to a first position in a direction away from the obstacle, wherein a distance from the first position to the obstacle is not less than the preset detection distance; and a navigation unit configured to detect the obstacle at the first position and navigate based on a detection result.

According to specific embodiments of the present disclosure, in a third aspect, the present disclosure provides a computer-readable storage medium, storing a computer program thereon, wherein the program, when executed by a processor, implements the method for detecting the unknown obstacle according to the first aspect.

According to specific embodiments of the present disclosure, in a fourth aspect, the present disclosure provides an electronic device. The electronic device includes: one or more processors; and a storage device configured to store one or more programs, wherein the one or more programs, when executed by the one or more processors, enables the one or more processors to implement the method for detecting the unknown obstacle according to the first aspect.

BRIEF DESCRIPTION OF THE DRAWINGS

The above and other features, advantages and aspects of various embodiments of the present disclosure will become more apparent with reference to accompanying drawings and the following specific embodiments. The same or similar reference signs indicate the same or similar elements throughout the accompanying drawings. It should be understood that the accompanying drawings are exemplary and components and elements are not necessarily drawn to scale. In the accompanying drawings.

DETAILED DESCRIPTION

The embodiments of the present disclosure are described in more detail below with reference to the accompanying drawings. Although some embodiments of the present disclosure are shown in the accompanying drawings, it should be understood that the present disclosure may be implemented in various forms and should not be construed as being limited to the embodiments set forth herein. Rather, these embodiments are provided for more thorough and complete understanding of the present disclosure. It should be understood that the accompanying drawings and embodiments of the present disclosure are merely provided for the purpose of illustration, and are not intended to limit the scope of protection of the present disclosure.

It should be understood that various steps described in the method embodiment of the present disclosure may be performed in different orders and/or in parallel. In addition, the method embodiment may include an additional step and/or omit implementation of an illustrated step. The scope of the present disclosure is not limited in this regard.

The term "include" and variations thereof used herein are open-ended inclusions, i.e., "include(s) but are/is not limited to". The term "based on" refers to "at least partially based on". The term "one embodiment" means "at least one embodiment". The term "another embodiment" means "at least one additional embodiment". The term "some embodiments" means "at least some embodiments". Relevant definitions of other terms will be given in the following description.

It should be noted that concepts such as "first" and "second" mentioned in the present disclosure are merely used to distinguish different apparatuses, modules or units, rather than limiting an order or interdependence of functions executed by these apparatuses, modules or units.

It should be noted that "a/an" and "a plurality" mentioned in the present disclosure are illustrative and not restrictive, and those skilled in the art should understand that unless otherwise indicated clearly in the context, they should be understood as "one or more".

At present, the autonomous mobile robot has very limited ability to recognize obstacles through the camera, has relatively high requirements on recognition distances for unknown obstacles, and can ensure the recognition accuracy only within an appropriate distance range. Therefore, if an obstacle suddenly appears within a relatively short distance range during the moving process, the autonomous mobile robot will collide with the obstacle as it cannot correctly recognize the obstacle.

In the embodiments of the present disclosure, names of messages or information exchanged among a plurality of apparatuses are only for the purpose of illustration, and are not intended to limit the scope of these messages or information items. The present disclosure provides a method and apparatus for detecting an unknown obstacle, a medium and an electronic device. In the present disclosure, if a autonomous mobile robot detects an unknown type of obstacle within an undetectable distance range in a moving process, it moves away from the obstacle to be within an effective detection distance range, and then navigates based on an effective detection result. Thus, the problem that unknown obstacles cannot be detected within a short distance range is solved, and collision with the unknown obstacles within the short distance range during moving is avoided.

Embodiments of the present disclosure are described in detail below with reference to the accompanying drawings.

The present disclosure provides a first embodiment, i.e., an embodiment of a method for detecting an unknown obstacle.

Figure 2:
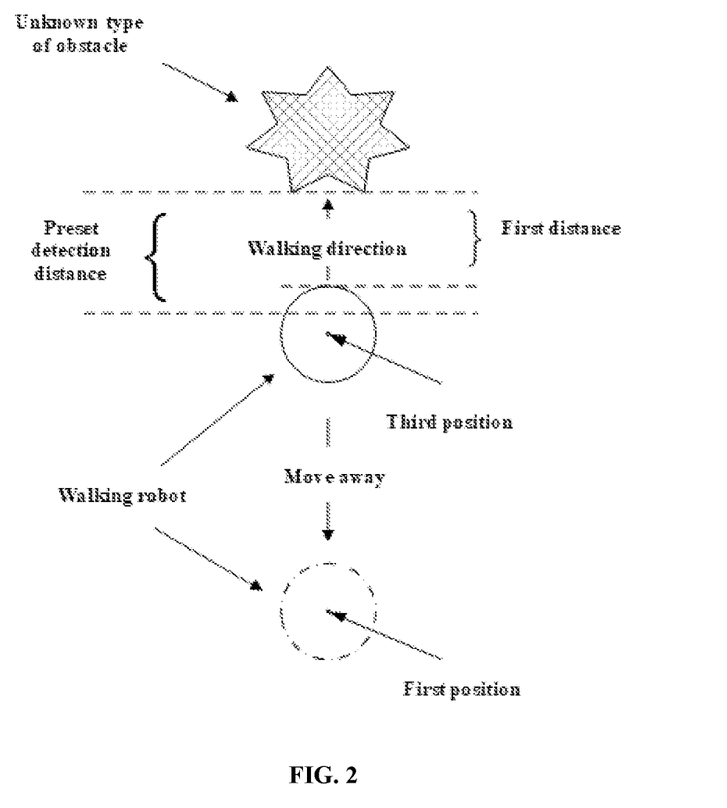
FIG. 2 shows a schematic diagram of the method for detecting the unknown obstacle according to the embodiment of the present disclosure.

As shown in FIG. 2, a autonomous mobile robot detects an obstacle in a moving direction through a camera, and navigates based on a detection result. However, due to the limitation of the camera, the autonomous mobile robot cannot effectively detect an unknown type of obstacle that appears within certain distance range and thus cannot navigate based on the detection result, resulting in collision with the obstacle. In view of the above problem, embodiments of the present disclosure provide a method for detecting an unknown obstacle.

Figure 1:
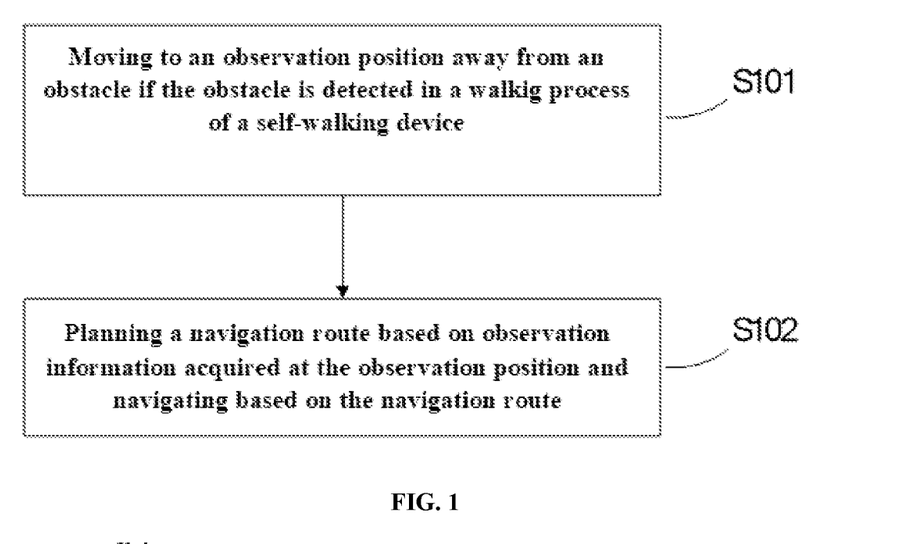
FIG. 1 shows a flowchart of a method for detecting an unknown obstacle according to an embodiment of the present disclosure.

The embodiment of the present disclosure will be described in detail below with reference to FIG. 1, FIG. 2 and FIG. 5.

Figure 5:
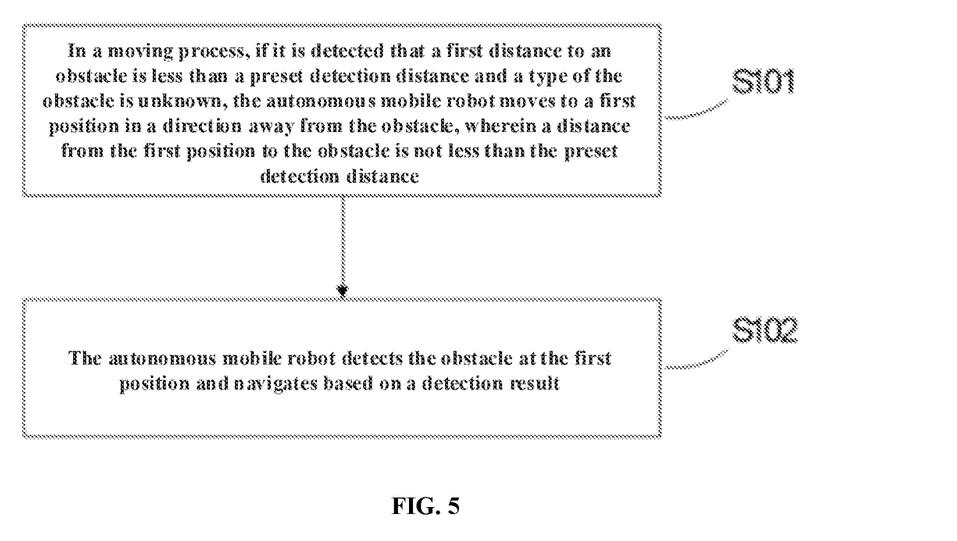
FIG. 5 shows a flowchart of a method for detecting an unknown obstacle according to an embodiment of the present disclosure.

As shown in FIG. 5, in step S101, in a moving process, if it is detected that a first distance to an obstacle is less than a preset detection distance and a type of the obstacle is unknown, the autonomous mobile robot moves to a first position in a direction away from the obstacle, wherein a distance from the first position to the obstacle is not less than the preset detection distance. In some embodiment, as shown in FIG. 1, in step S101, moving, by the autonomous mobile robot, to an observation position away from an obstacle if the obstacle is detected in a moving process of the autonomous mobile robot. For example, the observation position may be the first position.

The preset detection distance is related to a sensor which is disposed on the autonomous mobile robot, and the sensor is used for detecting an unknown type of obstacle in a moving direction. The sensor is capable of accurately detecting an unknown type of obstacle within certain detection range, but cannot effectively detect an unknown type of obstacle beyond this detection range. For example, the sensor is a camera, and the autonomous mobile robot measures a distance to the unknown type of obstacle through a distance measurement apparatus, and detects the type of the obstacle through the camera. When an object distance between the camera and the obstacle is less than the focal length of the camera, the camera may only capture a virtual image or a partial image of the obstacle and thus cannot detect the type of the obstacle. Therefore for the autonomous mobile robot that detects the obstacle through the camera, the preset detection distance is at least greater than or equal to the focal length of the camera. For example, the preset detection distance is not less than 30 cm.

The unknown type of obstacle is usually an obstacle which suddenly appears in the moving direction of the autonomous mobile robot and from which a distance to the autonomous mobile robot is less than the preset detection distance, or an obstacle which enters a detection range and from which a distance to the autonomous mobile robot is less than the preset detection distance when the autonomous mobile robot changes its moving direction.

In some examples, the step that the autonomous mobile robot moves to the first position in the direction away from the obstacle includes the following steps: the autonomous mobile robot retreats to a second position in the direction away from the obstacle, wherein a distance from the second position to the obstacle is not less than the preset detection distance; and the autonomous mobile robot rotates 90 degrees at the second position and moves forward by a first preset distance to the first position.

The above steps ensure that a measurement direction of the sensor of the autonomous mobile robot is always kept the same as a target direction. For example, for the above camera, when the autonomous mobile robot moves away from the obstacle, a shooting direction of the camera of the autonomous mobile robot is kept the same as the direction of a target obstacle by retreating. When the autonomous mobile robot rotates 90 degrees after reaching the second position, the camera also rotates 90 degrees, and thus the shooting direction of the camera is kept the same as the target direction. Therefore, the accuracy of the measured distance in the process that the autonomous mobile robot moves away from the obstacle is ensured.

As shown in FIG. 5, in step S102, the autonomous mobile robot detects the obstacle at the first position and navigates based on a detection result. In some embodiments, as shown in FIG. 1, step S102 includes planning a navigation route based on observation information acquired at the observation position (e.g., the first position) and navigating based on the navigation route.

After the autonomous mobile robot reaches the first position and may effectively detect the type of the obstacle, the autonomous mobile robot can effectively navigate based on the detection result, thereby avoiding collision with the unknown type of obstacle.

In some examples, the step that the autonomous mobile robot detects the obstacle at the first position includes: the autonomous mobile robot rotates to face the obstacle at the first position, and detects the obstacle.

Further, the step that the autonomous mobile robot detects the obstacle includes: the autonomous mobile robot detects the obstacle within a preset detection period.

To ensure that the autonomous mobile robot can stably detect the unknown type of obstacle during moving, the embodiment of the present disclosure provides a stable detection time with the preset detection period. For example, for the above autonomous mobile robot taking the camera as the sensor, the preset detection period is 500 milliseconds.

Further, the step that the autonomous mobile robot navigates based on the detection result at least includes: the autonomous mobile robot navigates to a third position based on the detection result, wherein the third position is a start position of movement in the direction away from the obstacle.

After deviating from an originally planned moving route, when moving on a re-planned moving path, some autonomous mobile robots need to bypass unknown types of obstacles based on the originally planned moving route. For example, the autonomous mobile robot is a sweeping robot, the re-planned moving route of the autonomous mobile robot is to return to a start position away from the obstacle, and then start to bypass the obstacle from this position so as to ensure that the sweeping robot sweeps the entire ground.

In some examples, after the step that the autonomous mobile robot detects the obstacle at the first position and navigates based on the detection result, the method further includes: the autonomous mobile robot generates mark information based on the detection result.

The purpose of generating the mark information is to transmit the mark information to a map display terminal. The map display terminal is configured to display a digitalized trajectory map. After acquiring the mark information, the map display terminal gives a prompt about the obstacle in the trajectory map, so that the autonomous mobile robot may avoid the obstacle in a timely manner during the next movement, thereby saving the detection time and improving the moving efficiency.

In the embodiment of the present disclosure, if the autonomous mobile robot detects the unknown type of obstacle within the undetectable distance range in the moving process, it moves away from the obstacle to be within the effective detection distance range, and then navigates based on the effective detection result. Thus, the problem that unknown obstacles cannot be detected within the short distance range is solved, and collision with the unknown obstacles within the short distance range during moving is avoided.

Corresponding to the first embodiment provided by the present disclosure, the present disclosure further provides a second embodiment, i.e., an apparatus for detecting an unknown obstacle. As the second embodiment is basically similar to the first embodiment, the second embodiment is described relatively simply, and for related parts, reference may be made to the corresponding description of the first embodiment. The apparatus embodiment described below is merely exemplary.

Figure 3:
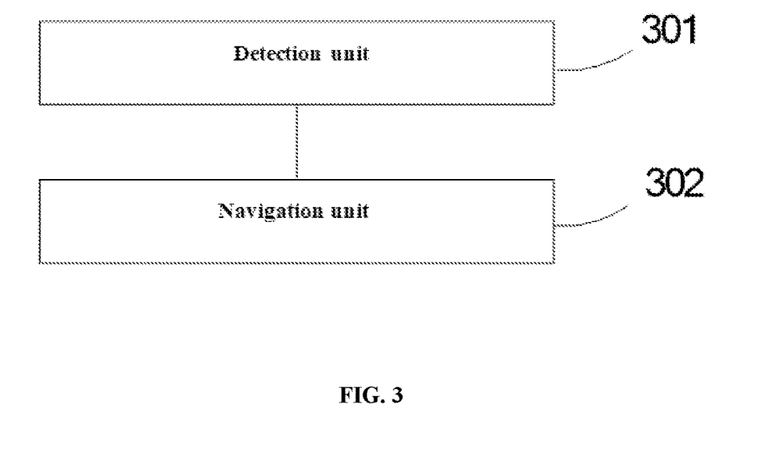
FIG. 3 shows a block diagram of units of an apparatus for detecting an unknown obstacle according to an embodiment of the present disclosure.

FIG. 3 shows an embodiment of an apparatus for detecting an unknown obstacle provided by the present disclosure.

As shown in FIG. 3, the present disclosure provides an apparatus for detecting an unknown obstacle. The apparatus includes:
  a detection unit 301 configured to: in a moving process, if it is detected that a first distance to an obstacle is less than a preset detection distance and a type of the obstacle is unknown, move to a first position in a direction away from the obstacle, wherein a distance from the first position to the obstacle is not less than the preset detection distance; and
  a navigation unit 302 configured to detect the obstacle at the first position and navigate based on a detection result.

In some examples, the detection unit 301 includes:
  a retreating sub-unit configured to retreat to a second position in the direction away from the obstacle, wherein a distance from the second position to the obstacle is not less than the preset detection distance; and
  a rotating sub-unit configured to rotate 90 degrees at the second position and move forwards by a first preset distance to the first position.

In some examples, the navigation unit 302 includes:
  a facing sub-unit configured to rotate to face the obstacle at the first position and detect the obstacle.

In some examples, the facing sub-unit includes:
  a stable detection sub-unit configured to detect the obstacle within a preset detection period.

In some examples, the navigation unit 302 at least includes:
  a returning sub-unit configured to navigate to a third position based on the detection result, wherein the third position is a start position of movement in the direction away from the obstacle.

In some examples, the preset detection distance is not less than 30 cm.

In some examples, the apparatus further includes:
  a generating unit configured to generate mark information based on the detection result.

In the present disclosure, if the autonomous mobile robot detects the unknown type of obstacle within the undetectable distance range in the moving process, it moves away from the obstacle to be within the effective detection distance range, and then navigates based on the effective detection result. Thus, the problem that unknown obstacles cannot be detected within the short distance range is solved, and collision with the unknown obstacles within the short distance range during moving is avoided.

A third embodiment of the present disclosure provides an electronic device for implementing a method for detecting an unknown obstacle. The electronic device includes at least one processor, and a memory in communication connection with the at least one processor,
  wherein the memory stores instructions executable by the at least one processor to cause the at least one processor to execute the method for detecting an unknown obstacle according to the first embodiment.

A fourth embodiment of the present disclosure provides a computer storage medium for implementing a method for detecting an unknown obstacle. The computer storage medium stores computer-executable instructions which can implement the method for detecting an unknown obstacle according to the first embodiment.

Figure 4:
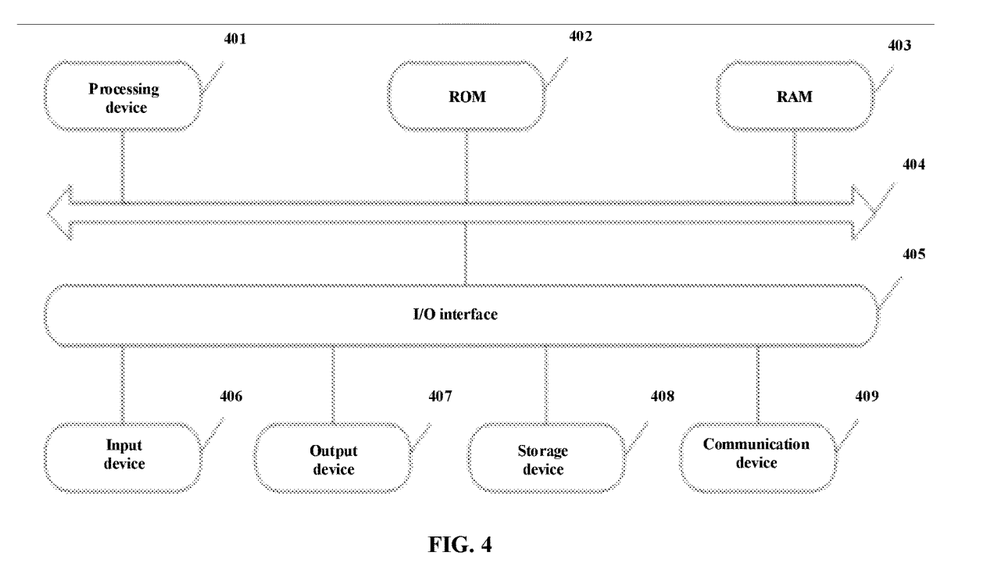
FIG. 4 shows a schematic diagram of a connection structure of an electronic device according to an embodiment the present disclosure.

Referring to FIG. 4, it shows a schematic structural diagram of an electronic device for implementing an embodiment of the present disclosure. The electronic device of the present disclosure may include, but is not limited to, a mobile terminal such as a mobile phone, a notebook computer, a digital broadcast receiver, a PDA (personal digital assistant), a PAD (tablet computer), a PMP (portable multimedia player), an onboard terminal (such as an onboard navigation terminal) and a fixed terminal such as a digital TV and a desktop computer. The electronic device shown in FIG. 4 is only an example, and is not intended to limit the function and application range of the embodiments of the present disclosure.

As shown in FIG. 4, the electronic device may include a processing device 401 (e.g., a central processor, a graphics processor or the like) which can execute various proper actions and processing according to programs stored in a read-only memory (ROM) or programs loaded into a random-access memory (RAM) 403 from a storage device 408. Various programs and data required for operation of the electronic device are also stored in the RAM 403. The processing device 401, the ROM 402 and the RAM 403 are connected with each other by a bus 404. An input/output (I/O) interface 405 is also connected to the bus 404.

Generally, the following devices may be connected to the I/O interface 405: an input device 406 including, for example, a touch screen, a touchpad, a keyboard, a mouse, a camera, a microphone, an accelerometer, a gyroscope and the like; an output device 407 including, for example, a liquid crystal display (LCD), a speaker, a vibrator and the like; a storage device 408 including, for example, a magnetic tape, a hard disk and the like; and a communication device 409. The communication device 409 can allow the electronic device to carry out wired or wireless communication with other devices so as to exchange data. FIG. 4 shows the electronic device with various apparatuses, but it should be understood that all shown devices are not required to be implemented or included. More or fewer devices may be alternatively implemented or included.

Particularly, according to the embodiments of the present disclosure, the process described above with reference to the flow chart may be implemented as a computer software program. For example, a computer program product is provided according to an embodiment of the present disclosure, includes a computer program carried on a non-transitory computer-readable medium, wherein the computer program contains a program code for executing the method shown in the flow chart. In such an embodiment, the computer program may be downloaded and installed from the network by the communication device 409, or installed from the storage device 408, or installed from the ROM 402. When the computer program is executed by the processing device 401, the above functions defined in the method provided by the embodiment of the present disclosure are executed.

It should be noted that the above storage medium in the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, apparatus, or device, or a combination of any of the above. More specific examples of the computer-readable storage medium may include, but not limited to: an electrical connection with one or more wires, a portable computer disk, a hard disk, a random-access memory (RAM), a read-only memory (ROM), an erasable programmable read-only memory (EPROM or flash memory), optical fiber, a portable compact disk read-only memory (CD-ROM), an optical storage device, a magnetic storage device, or any suitable combination of the above. In the present disclosure, the computer-readable storage medium may be any tangible medium which contains or stores a program, and the program may be used by or in combination with an instruction execution system, apparatus, or device. In the present disclosure, the computer-readable signal medium may include a data signal propagated in a baseband or as part of a carrier wave, and a computer-readable program code is carried therein. This propagated data signal may be in many forms, including but not limited to an electromagnetic signal, an optical signal, or any suitable combination of the above. The computer-readable signal medium may also be any storage medium other than the computer-readable storage medium, and the computer-readable signal medium may send, propagate, or transmit the program for use by or in combination with the instruction execution system, apparatus, or device. The program code contained on the storage medium may be transmitted by any suitable medium, including, but not limited to: a wire, an optical cable, RF (radio frequency), etc., or any suitable combination of the above.

In some embodiments, the client and the server can communicate by using any currently known or future-developed network protocol, for example, an HTTP (Hyper Text Transfer Protocol), and can be interconnected by a communication network of any form or any medium. Examples of the communication network include a local area network (LAN), a wide area network (WAN), an internet network (for example, the Internet), and an end-to-end network (for example, an ad hoc end-to-end network), and any currently known or future-developed network.

The above computer-readable storage medium may be included in the above electronic device, or may exist alone without being assembled into the electronic device.

The computer program codes for executing the operations of the present disclosure may be written in one or more programming languages or a combination thereof. The above programming languages include, but not limited to, object-oriented programming languages, such as Java, Smalltalk and C++, and also include conventional procedural programming languages, for example, "C" language or similar programming languages. The program codes may be executed entirely on a user computer, partly on the user computer, as an independent software package, partly on the user computer and partly on a remote computer, or entirely on the remote computer or a server. In the case of the remote computer, the remote computer may be connected to the user computer through any type of network, including the LAN or WAN, or may be connected to an external computer (for example, the Internet connection by an Internet service provider).

The flowcharts and block diagrams in the accompanying drawings of the present disclosure show the possible architecture, functions, and operations of a system, the method, and a computer program product according to various embodiments of the present disclosure. In this regard, each block in the flowcharts or block diagrams can represent a module, a program segment or a part of codes, and the module, the program segment or the part of the codes contains one or more executable instructions for implementing the defined logical functions. It should also be noted that in some implementations as alternatives, the functions labeled in the blocks can occur in an order different from the order labeled in the accompanying drawings. For example, two sequentially shown blocks can be substantially executed in parallel in fact, and they sometimes can also be executed in a reverse order, depending on related functions. It should also be noted that each block in the block diagrams and/or the flowcharts and the combination of the blocks in the block diagrams and/or the flowcharts can be implemented by a dedicated system based on hardware for executing defined functions or operations, or can be implemented by a combination of the dedicated hardware and computer instructions.

The units described in the embodiments of the present disclosure may be implemented in a software fashion or may be implemented in a hardware fashion. The names of the units do not constitute a limitation to the units in some cases.

The functions described above herein may be performed, at least in part, by one or more hardware logic components. For example, non-restrictively, exemplary types of hardware logic components that can be used include: a field programmable gate array (FPGA), an application-specific integrated circuit (ASIC), an application-specific standard product (ASSP), a system on chip (SOC), a complex programmable logic device (CPLD), and the like.

In the context of the present disclosure, a machine-readable medium may be a tangible medium that may contain or store a program for use by or in conjunction with an instruction execution system, apparatus or device. The machine-readable medium may be a machine-readable signal medium or a machine-readable storage medium. The machine-readable medium may include, but not limited to, an electronic, magnetic, optical, electromagnetic, infrared or semiconductor system, apparatus or device, or any suitable combination of the foregoing. A more specific example of the machine-readable storage medium includes an electrical connection based on one or more wires, a portable computer disk, a hard disk, a random-access memory (RAM), a read-only memory (ROM), an erasable programmable read-only memory (an EPROM or a flash memory), an optical fiber, a portable compact disk read-only memory (CD-ROM), an optical storage device, a magnetic storage device, or any suitable combination of the above content.

The foregoing description is only the description of preferred embodiments of the present disclosure and the used technical principle. A person skilled in the art should understand that the scope of the present disclosure in the present disclosure is not limited to a technical solution formed by a specific combination of the technical features. In addition, other technical solutions formed by any combination of the foregoing technical features or equivalent features thereof shall be encompassed without departing from the concept of the present disclosure. For example, the technical solutions formed by mutual replacement between the foregoing features and the technical features having similar functions (however, the technical features are not limited thereto) disclosed in the present disclosure shall be encompassed.

Furthermore, although a specific order is used to depict the operations, this should not be interpreted that these operations are required to be performed in the specific order shown or in sequential order of execution. Multitasking and parallel processing may be advantageous in particular environments. In addition, while several specific implementation details are included in the above discussion, these should not be construed as limiting the scope of the present disclosure. Some features described in the context of separate embodiments may also be implemented in combination in a single embodiment. Conversely, various features described in the context of a single embodiment may also be implemented in multiple embodiments individually or in any suitable sub-combination.

Although the present subject matter has been described using language specific to structural features and/or methodological actions, it should be understood that the subject matter defined in the appended claims is not necessarily limited to the particular features or actions described above. Rather, the particular features and actions described above are merely exemplary forms of implementing the claims.

What is claimed is:

1. A method for detecting an unknown obstacle, comprising:
   moving, by an autonomous mobile robot in response to a first distance from the autonomous mobile robot to an obstacle being less than a preset detection distance and a type of the obstacle being unknown, to a first position in a direction away from the obstacle, wherein a distance from the first position to the obstacle is not less than the preset detection distance, and the preset detection distance is greater than or equal to a focal length of a camera used for detecting the obstacle; and
   detecting, by the autonomous mobile robot, the obstacle at the first position and navigating based on a detection result.

2. The method according to claim 1, wherein said moving to the first position in the direction away from the obstacle comprises:
   retreating to a second position in the direction away from the obstacle, wherein a distance from the second position to the obstacle is not less than the preset detection distance; and
   rotating 90 degrees at the second position and moving forwards by a first preset distance to the first position.

3. The method according to claim 1, wherein said detecting the obstacle at the first position comprises:
   rotating to a direction facing the obstacle at the first position, and detecting the obstacle.

4. The method according to claim 3, wherein said detecting the obstacle comprises:
   detecting the obstacle by keeping the autonomous mobile robot stationary within a preset detection period.

5. The method according to claim 1, wherein said navigating based on the detection result comprises:
   navigating to a third position based on the detection result, wherein the third position is a start position of movement in the direction away from the obstacle.

6. The method according to claim 1, wherein the preset detection distance is not less than 30 cm.

7. The method according to claim 1, further comprises:
   generating mark information based on the detection result, wherein the mark information indicates presence of the obstacle.

8. A non-transitory computer-readable storage medium, storing a computer program thereon, wherein the program, when executed by a processor in an electronic device, implements steps of:
   moving, by the electronic device in response to a first distance to an obstacle being less than a preset detection distance and a type of the obstacle being unknown, to a first position in a direction away from the obstacle, wherein a distance from the first position to the obstacle is not less than the preset detection distance, and the preset detection distance is greater than or equal to a focal length of a camera used for detecting the obstacle; and
   detecting, by the electronic device, the obstacle at the first position and navigating based on a detection result.

9. An electronic device, comprising:
   one or more processors; and
   a storage device configured to store one or more programs, wherein the one or more programs, when executed by the one or more processors, enables the electronic device to implement steps of:
   moving, in response to a first distance from the electronic device to an obstacle being less than a preset detection distance and a type of the obstacle being unknown, to a first position in a direction away from the obstacle, wherein a distance from the first position to the obstacle is not less than the preset detection distance, and the preset detection distance is greater than or equal to a focal length of a camera used for detecting the obstacle; and detecting the obstacle at the first position by using sensor data of the obstacle and navigating based on a detection result.

10. The electronic device according to claim 9, wherein said moving to the first position in the direction away from the obstacle comprises:

retreating to a second position in the direction away from the obstacle, wherein a distance from the second position to the obstacle is not less than the preset detection distance; and rotating 90 degrees at the second position and moving forwards by a first preset distance to the first position.

11. The electronic device according to claim 9, wherein said detecting the obstacle at the first position comprises:

rotating to a direction facing the obstacle at the first position, and detecting the obstacle.

12. The electronic device according to claim 11, wherein said detecting the obstacle comprises:

detecting the obstacle by keeping the electronic device stationary within a preset detection period.

13. The electronic device according to claim 9, wherein said navigating based on the detection result comprises:

navigating to a third position based on the detection result, wherein the third position is a start position of movement in the direction away from the obstacle.

14. The electronic device according to claim 9, wherein the preset detection distance is not less than 30 cm.

15. The electronic device according to claim 9, wherein the one or more programs, when executed by the one or more processors, enables the one or more processors to further implement step of:

generating mark information based on the detection result, wherein the mark information indicates presence of the obstacle.

* * * * *